United States Patent [19]
Fields

[11] Patent Number: 5,950,512
[45] Date of Patent: Sep. 14, 1999

[54] APPARATUS TO MAKE BUILDING BLOCKS FOR BLOCKWORK DOMED STRUCTURES, AND METHOD AND DOMED STRUCTURE

[75] Inventor: Dale D. Fields, Shell Knob, Mo.

[73] Assignee: Gary D. Fields, Shell Knob, Mo.; a part interest

[21] Appl. No.: 08/947,562

[22] Filed: Oct. 9, 1997

Related U.S. Application Data

[60] Provisional application No. 60/028,303, Oct. 11, 1996.

[51] Int. Cl.[6] .................................. B26D 7/10; B26F 3/12
[52] U.S. Cl. ......................... 83/171; 83/699.51; 83/651.1
[58] Field of Search .............................. 30/116, 117, 140; 83/171, 651.1, 699.51

[56] References Cited

U.S. PATENT DOCUMENTS

| | | | |
|---|---|---|---|
| 3,064,111 | 11/1962 | Newman ................................. | 30/116 X |
| 3,199,388 | 8/1965 | Redfield ................................. | 30/116 X |
| 4,018,116 | 4/1977 | Treffner et al. ......................... | 83/171 X |
| 4,133,150 | 1/1979 | Yacoboni ................................. | 52/80 |
| 4,206,668 | 6/1980 | Creech ................................... | 83/171 |
| 4,221,148 | 9/1980 | Lewis ..................................... | 83/171 X |
| 4,262,461 | 4/1981 | Johnson et al. .......................... | 52/81 |
| 4,324,074 | 4/1982 | South et al. ............................. | 52/2 |
| 4,608,893 | 9/1986 | Huhne .................................... | 83/171 |
| 4,625,472 | 12/1986 | Busick .................................... | 52/81 |
| 4,683,792 | 8/1987 | Demont ................................... | 83/171 X |
| 4,754,678 | 7/1988 | Nichols et al. .......................... | 83/171 X |

FOREIGN PATENT DOCUMENTS

| | | | |
|---|---|---|---|
| 0097992 | 1/1984 | European Pat. Off. ................ | 83/171 |
| 0101426 | 8/1980 | Japan ...................................... | 83/171 |
| 0274999 | 11/1989 | Japan ...................................... | 83/171 |
| 0835779 | 7/1981 | U.S.S.R. .................................. | 83/171 |
| 1324848 | 7/1987 | U.S.S.R. .................................. | 83/171 |

OTHER PUBLICATIONS

Advertising pamplet of Key Dome Engineering, Inc., South Miami Florida, regarding building plans for plywood dome, 6 sheets, dated 1981.

"The Monolithic Dome Roundup," a publication of Monolithic Constructors, Inc., Italy, Texas, 16 pages, dated Sep./Oct. 1996.

Advertising pamphlet of the Monolithic Dome Institute, Italy, Texas, entitled "The Monolithic Dome," 8 sheets, 1997.

Primary Examiner—Rinaldi I. Rada
Assistant Examiner—T. Anthony Vaughn
Attorney, Agent, or Firm—Jonathan A. Bay

[57] ABSTRACT

Disclosed is an apparatus to make appropriately shaped masonry or foam building blocks for arranging and setting in courses or layers—masonry style—to build a blockwork domed structure therefrom, as well as, a method of making or cutting an individual block from a bar or billet of masonry or foam raw stock material (e.g., foam such as polystyrene and the like), and also, the resultant domed structure.

9 Claims, 9 Drawing Sheets

APPARATUS TO MAKE BUILDING BLOCKS FOR BLOCKWORK DOMED STRUCTURES, AND METHOD AND DOMED STRUCTURE

CROSS-REFERENCE TO PROVISIONAL APPLICATION(S)

This application claims the benefit of U.S. Provisional Application Ser. No. 60/028,303, filed Oct. 11, 1996.

BACKGROUND AND SUMMARY OF THE INVENTION

The invention generally relates to an apparatus to make appropriately shaped masonry or foam building blocks for arranging and setting in courses or layers—masonry style—to build a blockwork domed structure therefrom, as well as relating to, a method of making or cutting an individual block from a billet of masonry or foam raw stock material (e.g., foam such as polystyrene and the like), and also, the resultant domed structure.

U.S. Pat. Nos. 4,155,967 and 4,324,074—South et al., disclose a domed building structures and a method of making them. More particularly, those patent references disclose a dome building constructed by a process deploying spray-gun applied urethane and concrete (available at least under one brand name as SHOTCRETE™). The process involves pouring a ring foundation. If the dome is small the ring foundation and the circular base floor can be poured at once. Otherwise the circular base floor can be poured later. Steel hooks are embedded in the ring portion of the foundation. A fabric-walled bubble or membrane is attached to the ring foundation and inflated by fans. The fabric-walled membrane is scaled to and given the shape that is ultimately desired for the completed building. Hence the fabric-walled membrane serves as the form for the building during construction.

Next a coating of polyurethane foam is applied to the inside surface of the fabric-walled membrane via use of pressurized-spray equipment. The polyurethane-foam coating is built to a thickness of approximately three inches (8 cm) thick, and allowed to dry. The fans and a double-door airlock maintain pressure inside while the foam dries. Following that, steel reinforcing bar is hung on the foam and anchored to the hooks in the ring foundation. And after that, another coating is applied from the inside, this time it being the SHOTCRETE™ or the like. The concrete is allowed to set. The dome is thus complete. The fabric-walled membrane is left in place for forming a single-ply water-proofing membrane on the roof of the structure.

Domes constructed as described have proved popular in various applications including foremost among the applications as residential dwellings. One of the more attractive utilitarian features of these dome homes is their energy efficiency. The foam layer that extends three inches (8 cm) thick provides an effective R-value in excess of a whopping value of 60. There are anecdotal reports that a foam-dome residence in Texas was sufficiently heated during the winter by the equivalent of two hair dryers. Regardless, foam-dome building sites have ranged from the Equator to the Arctic Circle and northward particularly because of the economy they provide for cooling and/or heating. Also, the concrete inner layer acts as a heat sink for the inside temperature of the home, receiving and releasing the ambient temperature over time and hence smoothing out fluctuations.

Additionally, the stream-lined low profile of many of the dome homes has caused them more likely to survive a direct coastal hurricane assault than other home styles. Utilitarian features aside, homeowners of dome residences simply prefer its aesthetic qualities too, including how a dome profile attractively graces the natural environment.

There are shortcomings with the prior art method of producing a dome building. The profile of the building is limited to whatever shape can be inflated via an inflatable membrane. The thickness of the foam coating has a practical limit of whatever will adhere to and harden on the membrane without unduly flowing. Also, the uniformity of the thickness of the foam coating is susceptible to the same problems. What is needed is an improvement which overcomes the shortcomings of the prior art.

It is an object of the invention to provide an appropriately shaped masonry or foam building block for arranging and setting in courses or layers—masonry style—to build a blockwork domed structure therefrom.

It is an alternate object of the invention to provide a method of making or cutting an individual block from a billet of masonry or foam raw stock material.

It is another object of the invention to produce the resultant blockwork domed structure from the foregoing blocks.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 2b is a perspective view comparable to FIG. 2a except from another vantage point a third of the way around the structure to the right relative to FIG. 2a;

FIG. 4 is a sectional view taken through offset line IV—IV in FIG. 3a;

FIGS. 7a through 7c are a series of action sequence, diagrammatic plan views of a cutting apparatus in accordance with the invention, for producing the blocks as shown by FIGS. 6a and/or 6b, wherein FIGS. 7a through 7c show in sequence three views how a given block is sliced off an end of a billet of foam stock material;

DETAILED DESCRIPTION OF THE PREFERRED EMBODIMENTS

Figure 1:
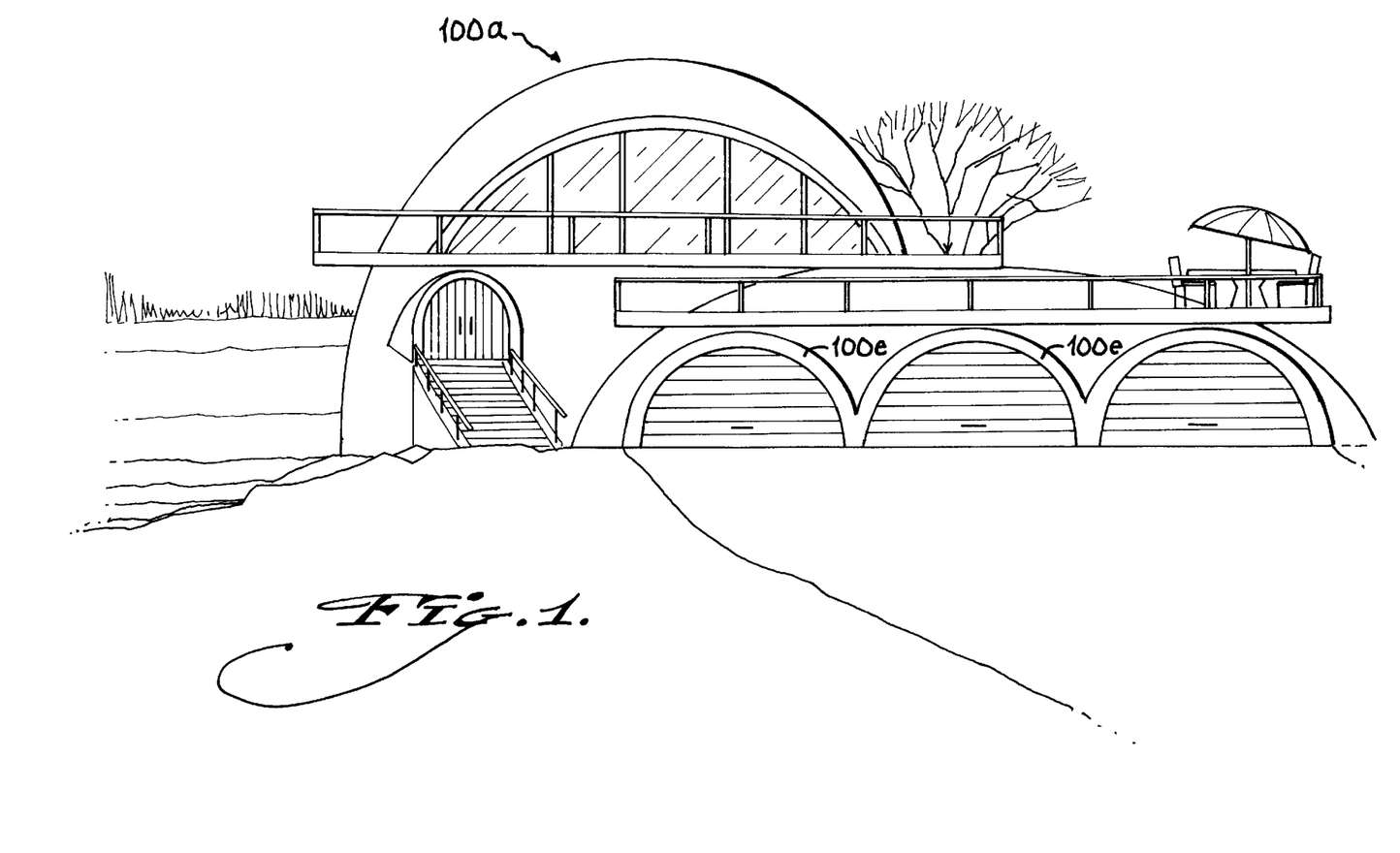
FIG. 1 is a perspective view of a foam-block domed-structure in accordance with the invention.

FIG. 1 is a perspective view of a residential dwelling constructed substantially around a foam-block domed-structure 100a in accordance with the invention. The car ports or garage entrances are likewise constructed substantially around a blockwork structure 100e in accordance with the invention, configured not as domes but more nearly like barrel arches.

Figure 2A:
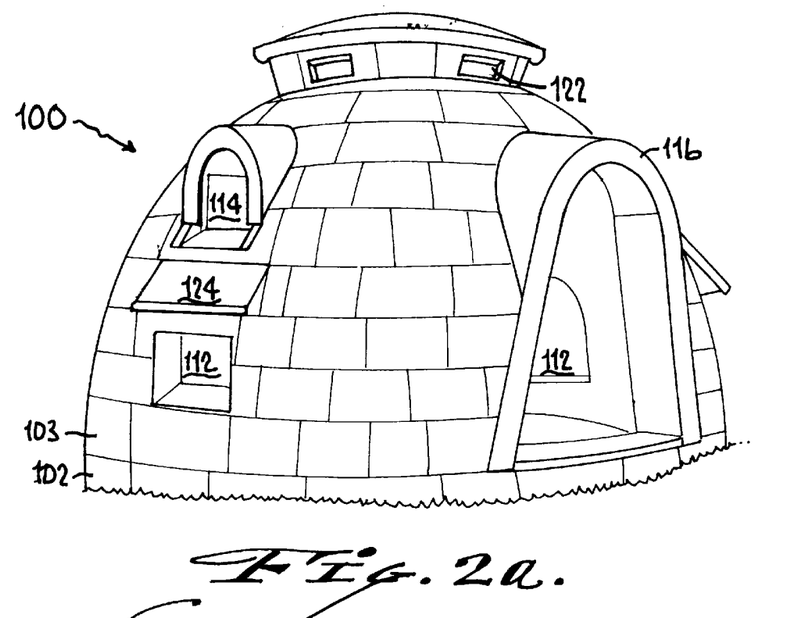
FIG. 2a is a perspective view of a scaled down, alternate version of a foam-block domed-structure in accordance with the invention.

FIG. 2a is a perspective view of a scaled down, alternate version of a foam-block domed-structure 100 in accordance with the invention. This structure provides the shell around which a dwelling as shown by FIG. 1, can be constructed. In FIG. 2a, the blockwork domed structure 100 in accordance with the invention is constructed of building blocks 102 given appropriate shapes relative to one another to arrange and set in units 102 and layers 130, masonry style, to form the blockwork domed structure 100. The blocks 102 preferably are formed of a foam material including for example polystyrene, and adhered together in place by any suitable adhesive including without limitation HENRY'S urethane adhesive, available from, among other vendors, The Foam Experts in Mesa, Ariz. The suitable adhesive preferably sets relatively quickly but does not harden to the extent of becoming brittle, and is durable for extended outside weathering through year round temperature and sunlight extremes.

Alternatively, the building blocks could be formed from other materials. Whereas the apparatus and method disclosed more particularly below for producing successive blocks from stock material is (are) shown in connection with foam stock material, persons having ordinary skill in the art could routinely adapt the inventive apparatus and method to work in other materials.

The domed structure 100 has an overall shape defined by a wall built from the blocks 102, it having an overall shape that takes the form of half an ovoid shell:—i.e., a hollow ovoid that is bisected into halves by the horizon. The wall thickness of the structure 100 as shown is nominally 10 cm (4 inches). The outside diameter of dome at ground level is about 3 m (10 feet). The height is about 2 m (7 feet). The domed structure 100 is given various apertures or accesses including scaled-down lower and upper story windows 112 and 114, a scaled-down garage door 116, a scaled-down walk-through door 118, and air vents 122. In the FIGS. 2a and 2b, the domed structure 100 is shown built to a reduced scale of about a one-fourth scale from actual preferred scale. It is preferred if the domed structure 100 in FIG. 2a were produced on a scale with about a 12 m (40 foot) base diameter. Not including the home shown by FIG. 1, the other drawings show the domed structure 100 to be about one-fourth scale relative to the preferred full size. A person having ordinary skill in the art could easily recognize from this description how to increase the scale of the blocks 102 fourfold in order to construct larger-sized domed structures as desired, and accordingly, the scale shown here in the drawings is used merely for convenience in this description and does not limit the invention to any particular scale.

Among the advantages of the foam construction are foam's high insulation properties, as mentioned above in connection with polyurethane foam (there being no substantial difference for polystyrene foam). Measurements taken by the inventor hereof include the findings that on a given summer afternoon when the temperature measures about 30° C. (90° F.), the temperature inside the domed structure 100 will measure as cool as about 20° C. (70° F.).

Figure 3A:
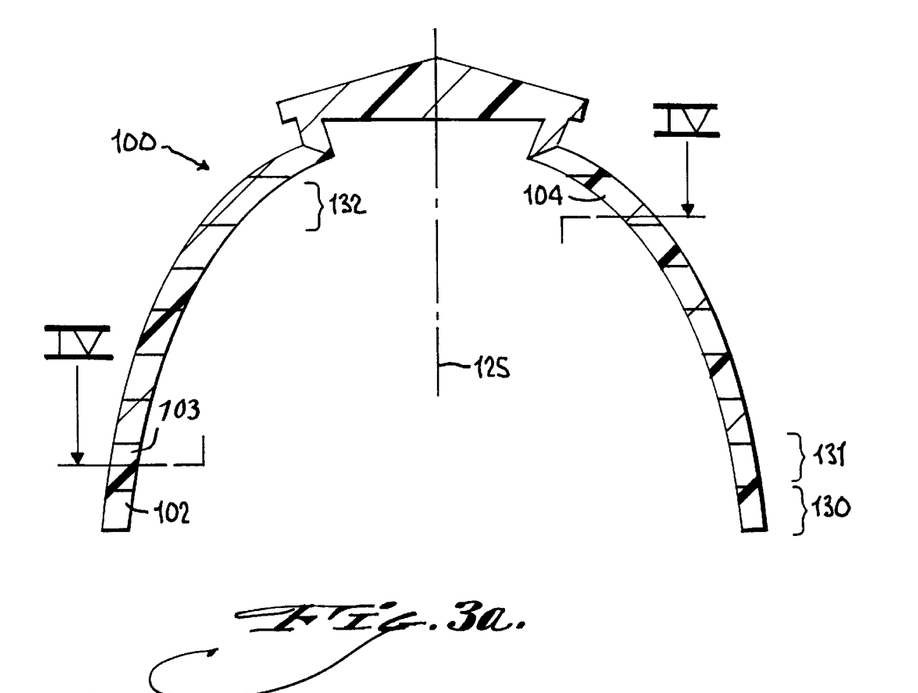
FIG. 3a is a sectional view thereof through a vertical plane of symmetry.

To turn to FIG. 3a, it shows that the domed structure 100 generally is cylindrically symmetrical about the previously-mentioned central, vertical axis of symmetry 125. The structure 100 is built in successive layers 130 (or courses or horizons) that successively slope (or slant or incline) in to the vertical axis of symmetry 125 at successively greater angles of inclination away from true vertical, as the layers or courses 130 progress upward. Each given course or layer 130 of blocks 102 extends along the perimeter of a given circle. As the layers or courses 130 progress upwards the given circle progressively shrinks. Also, the collective blocks 102 of each given layer or course 130 presents an exterior surface which defines the lateral face of a frustum of a right circular cone. The foregoing arrangement gives the structure 100 its domed-shell configuration.

Figures 3B, 3C:
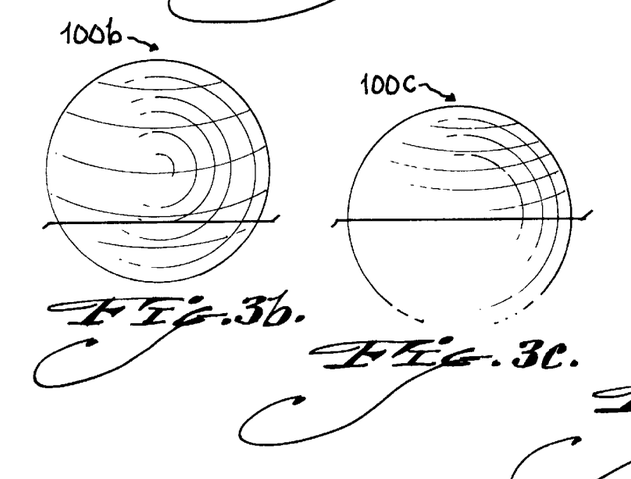
FIGS. 3b through 3d are a series of elevation views showing how profile of the foam-block domed-structure in accordance with the invention can be varied from between extremes of practically a sphere or otherwise a very shallow spherical cap.
Figure 3D:
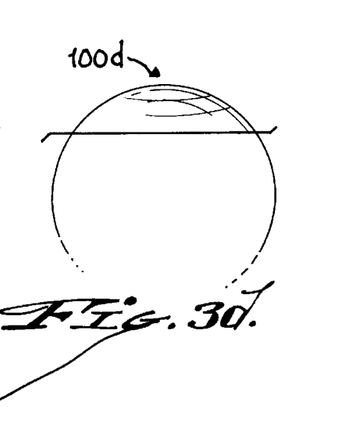

FIG. 3a also shows that the blocks 102 have planar top and bottom sides. These planar top and bottom sides extend parallel to one another in spaced horizontal planes. FIGS. 3b through 3d are a series of elevation views showing how profile of the foam-block domed-structure 100 in accordance with the invention can be varied from between extremes of practically a sphere 100b, and a very shallow spherical cap 100d, including intermediate sizes as well, as shown by for example structure 100c in FIG. 3c.

It is important to note that the blocks that construct the domes 100b, 100c, and 100d result in structures substantially configured in accordance with a spherical geometry. In distinction, the structure 100 is constructed around a hybrid geometry between substantial spherical and substantially cylindrical:—i.e., it being termed in accordance with a term of art ovoid shell, as previously stated. The lowest course 130 on the blockwork structure 100 in FIG. 3a forms substantially an "annulus" or circular ring. In other words, the lowest course 130 in FIG. 3a is arranged substantially around a cylindrical geometry.

Figure 5:
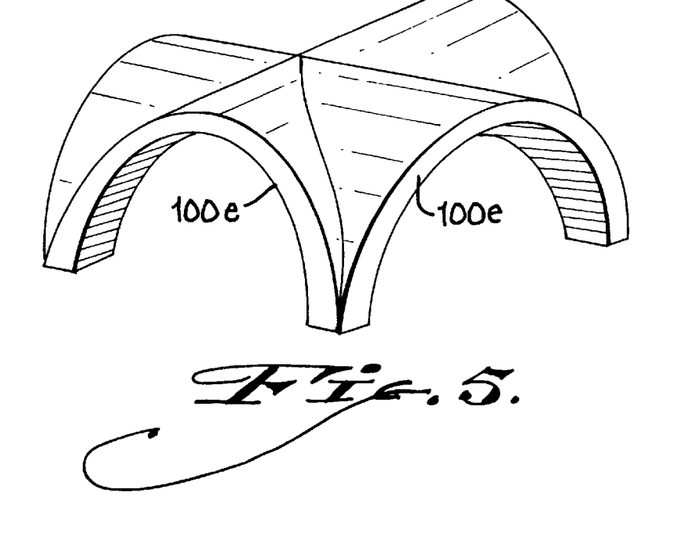
FIG. 5 is a perspective view of another version of a foam-block blockwork structure in accordance with the invention, this structure taking the shape of intersecting barrel vaults.

The adaptability of forming the blocks 102 in accordance with cylindrical coordinates allows construction of structures arranged on cylindrical geometries such as the barrel vault garages 100e shown in FIG. 1, or the four-way passageway defined by intersecting barrel vaults 100e as shown by FIG. 5. Other geometries could be devised with routine skill by persons have ordinary skill in the art.

Figure 4:
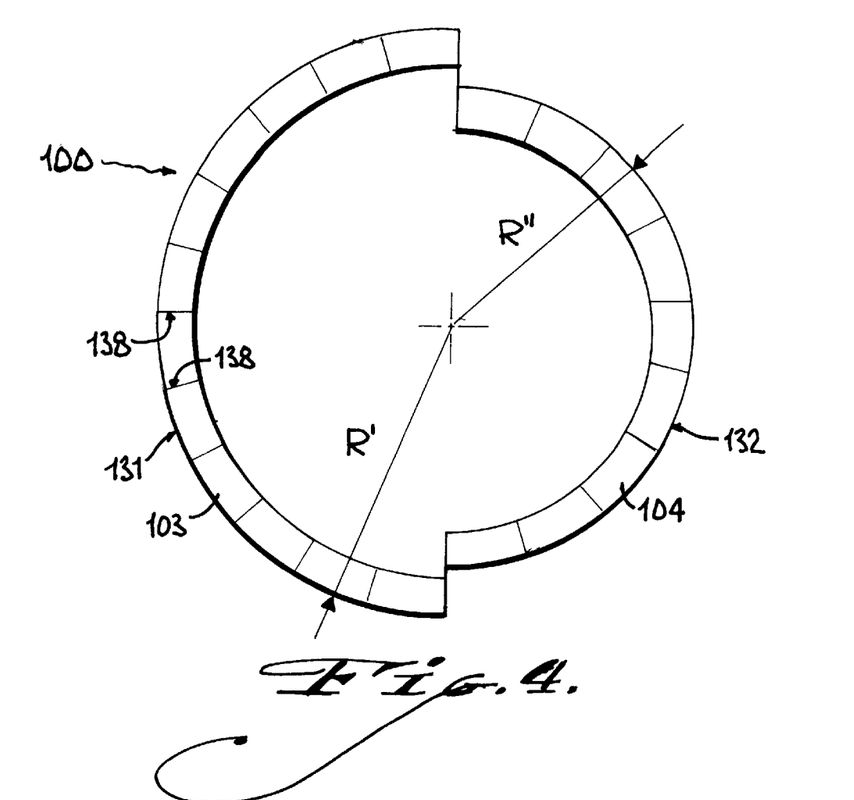

FIG. 4 shows that the given layer 131 which occupies the left-half of the view, defines a given outer radius indicated by reference letter R'. The other layer 132 in FIG. 4, which occupies the right-half of the view, defines another, relatively shorter outer radius indicated by reference letter R".

FIG. 4 also shows that the typical block 103 or 104 has opposite planar lateral sides 138. These lateral sides 138 are not parallel to each other. Instead, if these lateral sides 138 were extended inwardly to the central vertical axis of symmetry 125, they would converge on and intersect the central axis 125, and would thereby define a wedge shape (not illustrated). Each block 102–104 in a given layer 130–132 generally is identical to every other block in that layer (excluding special blocks that form windows, doors or overhangs and the like). Yet a block in one layer generally is different from a block in another layer. Generally, when comparing blocks in different layers, a block (e.g., 103) in a relatively lower layer (e.g., 131) will define a relatively larger outer radius (R') than a block (e.g., 104) in relatively higher layer (e.g., 132), as shown by FIG. 4. Also, a block (e.g., 103) in a relatively lower layer (e.g., 131), when viewed in a section cut (i.e, see FIG. 3a), slopes or reclines away from the vertical direction relatively less so than a block (e.g., 104) in a relatively higher layer (e.g., 132), as shown by FIG. 3a.

Figures 6A, 6B:
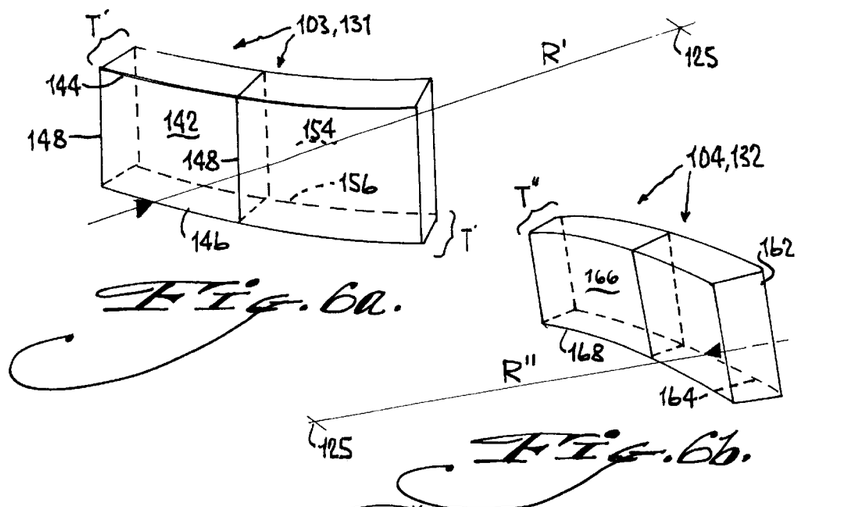
FIG. 6a is an enlarged perspective view of a pair of adjacent blocks in FIG. 4, one of which is intersected by reference outer radius R'.
FIG. 6b is a perspective view, comparable to FIG. 6a, of a different pair of adjacent blocks in FIG. 4, one of which is intersected by reference outer radius R"

To turn to FIG. 6a, it shows two adjacent blocks 103 from the lower layer 131 of FIG. 4 (i.e., the layer on the left half on the view). Each block 103 has an outer face 142 which generally is a rectangular portion of a surface of a given right circular cone. More particularly, the outer face 142 is defined between upper and lower arc segments 144 and 146 that extend between opposite vertical edges 148. The lower arc segment 144 defines radius R' relative to the central vertical axis of symmetry 125. Each block 103 has a corresponding inner face 154 spaced away from the outer face 103 by the block's thickness T'. The inner face 154 likewise is generally a rectangular portion of a surface of another given right circular cone. Thus, the inner face has for its borders opposite vertical edges extending between an upper arc segment and a lower arc segment 156. The lower arc segment 156 defines a radius equal to R' minus T' (the thickness of block 103), relative to the central vertical axis of symmetry 125.

FIG. 6b shows a generally similar arrangement for two adjacent blocks 104 from the upper layer 132 of FIG. 4 (i.e., the layer on the right half of the view). Each block 104 has an outer face 162 that has the outline of rectangle and the contour of a surface of some given right circular cone. More particularly, the outer face 162 is defined between opposite vertical edges extending between an upper arc segment and a lower arc segment 164. The lower arc segment 164 defines radius R" relative to the central vertical axis of symmetry 125. Each block 104 has a corresponding inner face 166 spaced away from the outer face 162 by the block's thickness T". Generally, this thickness T" is not the same thickness T' for the blocks 103 in FIG. 6a. The inner face 166 of the blocks 104 in FIG. 6b is again generally a rectangular portion of a surface of still another given right circular cone. That gives the inner face 166 for its borders, opposite vertical edges extending between an upper arc segment and a lower arc segment 168. The lower arc segment 168 defines a radius equal to R" minus T", relative to the central vertical axis of symmetry 125.

Figure 2B:
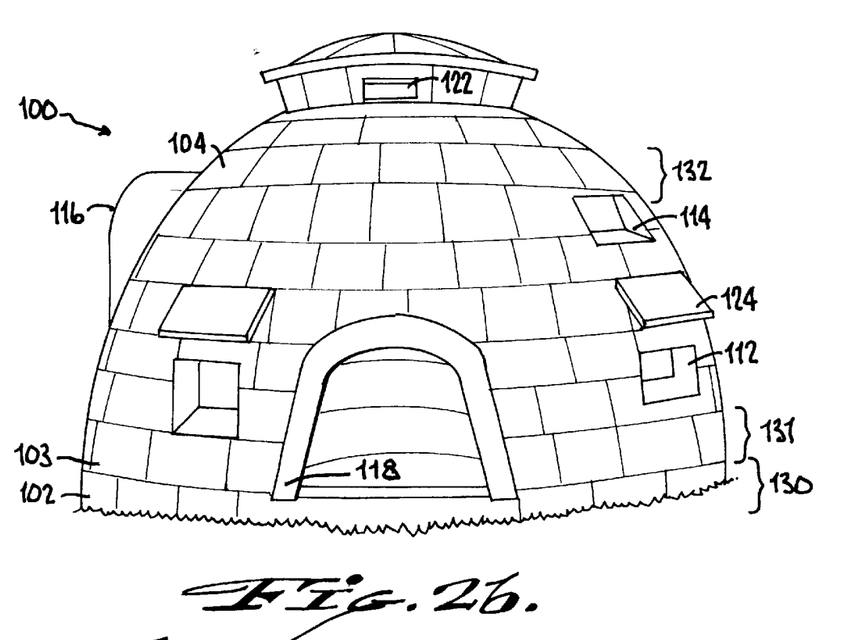
Figure 7A:
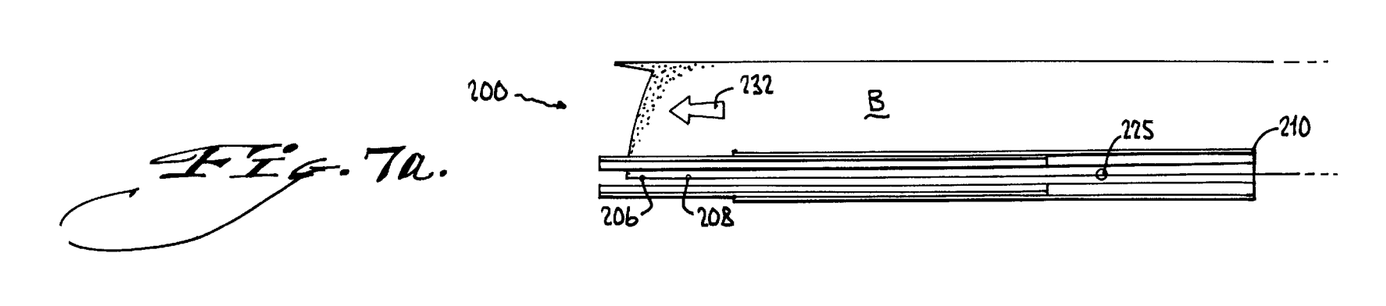
Figure 7B:
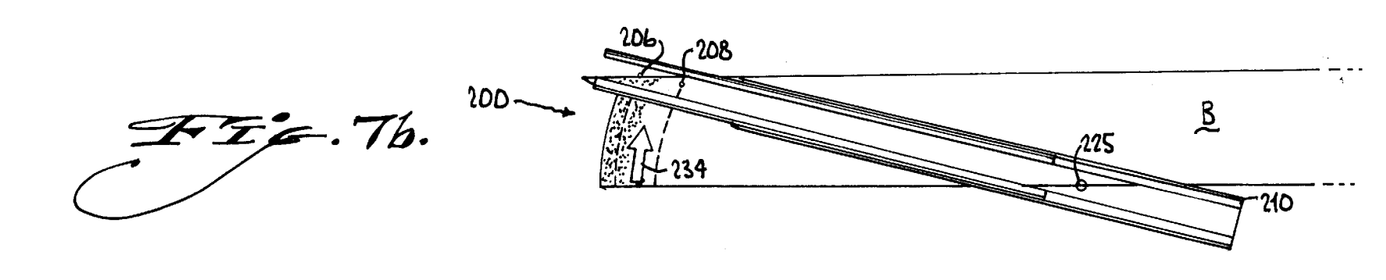
Figure 7C:
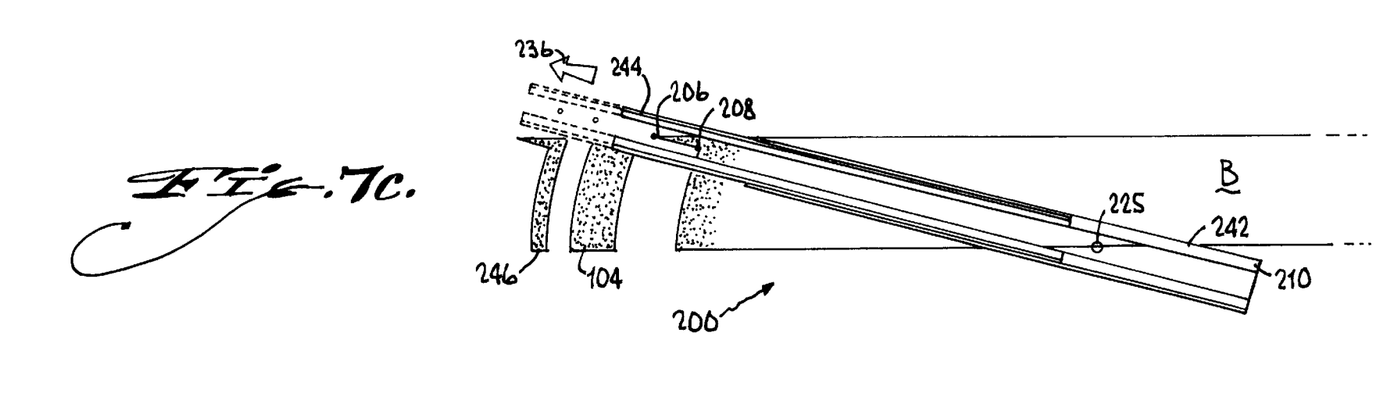

FIGS. 7a through 7c are a series of stop-action plan views of a cutting apparatus 200 in accordance with the invention for variously producing the blocks 102 through 104 that make the domed structure 100 in FIGS. 2a and 2b, in all the variety that blocks 10 through 104 need be produced. FIGS. 7a through 7c are diagrammatic views and thus much detail is not shown. For example, the cutting apparatus 200 comprises a bed which is not shown in FIGS. 7a through 7c, however the bed 204 is more particularly shown in FIG. 10, as described further below. In FIGS. 7a through 7c, it is taken as a given that the billet of foam block material (indicated by reference letter B) is supported by some horizontal planar surface, which in actuality is the bed 204 (not shown in FIGS. 7a–7c, but see FIG. 10).

As shown by FIGS. 7a through 7c, blocks like any of blocks 102–104 are sliced off one at a time from an end of an elongated billet B of foam block material. The slicing action is achieved by a pair of resistance-heated hot wires 206 and 208 carried relatively near a free end of a pivotal boom 210. Wires 206 and 208 are better shown by FIG. 8, and with reference thereto, the pivotal boom 210 comprises upper and lower open-rectangular frames 212 and 214 spaced vertically apart by opposite side boards 216. The side boards 216 are preferably wooden or some other non-conductive material to electrically isolate the upper frame 212 from the lower frame 214.

Each of the upper and lower frames 212 and 214 carries a leading and trailing wire-terminal fixture 220 and 222. The leading wire-terminal fixture 220 is closer to the free end of the pivotal boom 210. The trailing wire-terminal fixture 222 is closer to the pivot axis (not shown in FIG. 8, but see reference numeral 225 in FIGS. 7a–7c) for the pivotal boom. Between the leading wire-terminal fixture 220 on the upper frame 212 and the leading wire-terminal fixture 220 on the lower frame 214 extends one Nichrome wire, i.e., the leading wire 206. The span between trailing wire-terminal fixtures 222 on the upper and lower frames 212 and 214 is spanned by another Nichrome wire, i.e., the trailing wire 208. These Nichrome wires 206 and 208 are electrically connected to a supply of current as, for example, an arc welder's power supply 228, such that they become sufficiently heated to melt or burn through any foam in their path.

Figure 8:
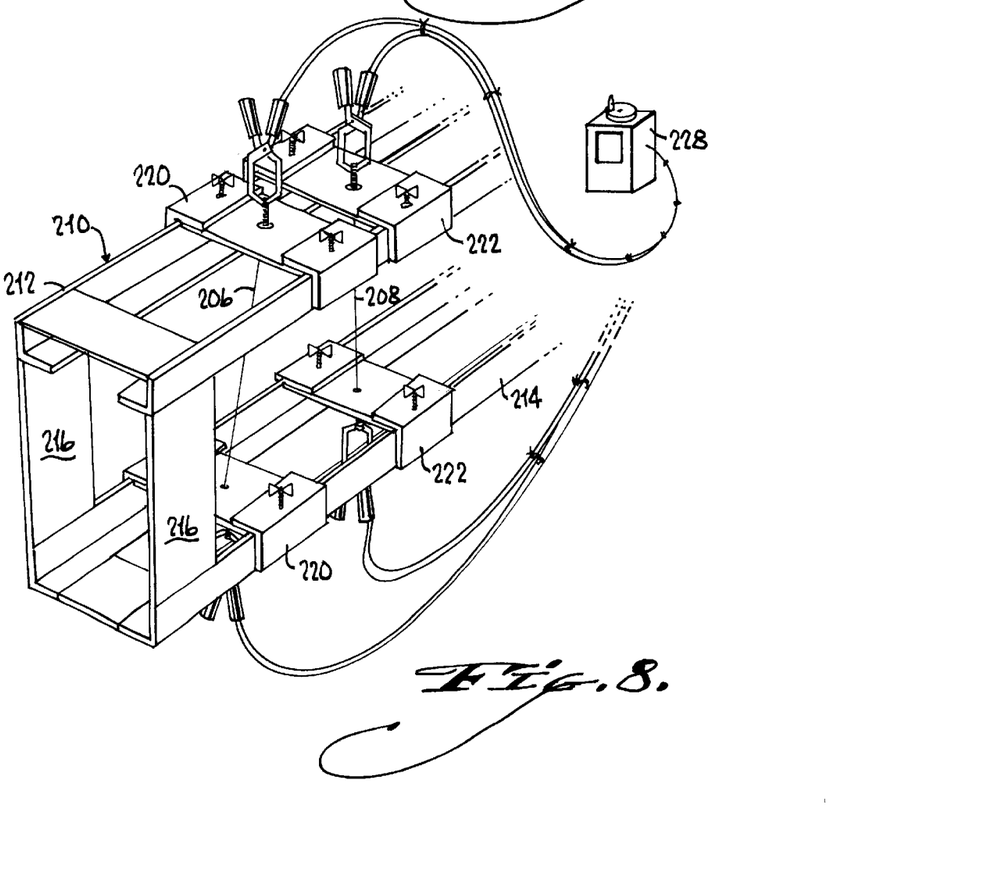
FIG. 8 is an enlarged perspective view of the slicing end of the pivotal boom shown by FIGS. 7a through 7c, wherein the slicing end comprises a pair of spaced, resistance-heated hot wires that are supplied current via an arc welder's power supply.

The wire-terminal fixtures 220 and 222 are adjustable on their respective frames 212 and 214 between various extended and retracted positions relative to the pivot axis 225 (which lies out of view to the right in FIG. 8, and therefore see FIGS. 7a–7c). The wires 212 and 216 can be variably tensioned or slackened in order to maintain the wires appropriately taut between their respective terminal fixtures 220 and/or 222 as the span between upper and lower ones of the terminal fixtures 220 and/or 222 changes. This adjustability allows a user to accomplish some of the following. The wires 220 and 222 can be temporarily fixed in various angles of inclination as, for example, true vertical (as shown by the trailing wire 208), or various angles inclined away from the vertical, such as the oblique alignment shown by the leading wire 206. Ordinarily, the leading and trailing wires 206 and 208 are aligned parallel to each other, spaced apart by the desired thickness T' or T" and the like (see FIG. 6a and/or 6b) for the blocks 102 through 104. In the dome 100 of FIGS. 2a and 2b, the blocks 102–104 are more or less about 10 cm (4 inches) thick. Thus the wires would preferably be set somewhere in the neighborhood of 10 cm (4 inches) apart and aligned parallel regardless of relative obliquity.

If both wires 206 are arranged along true vertical and spaced parallel to each other, then the wires will produce blocks comparable to the blocks 102 that constitute the lowest course 130 in FIG. 2a. These blocks 102 in the lowest course are simply wedge-shaped section of an annulus. They would likewise be suitable for constructing other forms arranged substantially around cylindrical geometries such as the barrel-vault garages 100e shown in FIG. 1 or the intersecting barrel vaults 100e shown by FIG. 5.

In the apparatus 200 as is it is set up for FIGS. 7a through 7c, the relative angle of inclination for the wires 206 and 208 would be chosen depending on which specific layer (from among layers 130–132) in which the block (from among blocks 102–104) is designed to be placed. For example, with reference to FIG. 3a, the blocks 102 in the ground layer 130 (i.e., the lowest layer in FIGS. 2a and 2b) would be sliced off from billet B with the wires aligned nearly vertical and 10 cm (4 inches) apart (not shown). But for comparison, the blocks 104 that comprise the layer 132 above line IV—IV on the right-half of FIG. 3a (i.e., the blocks 104 shown FIG. 6b) would require that the wires be aligned at about 45° and spaced apart something greater than 10 (4 inches).

To return to FIGS. 7a through 7c, what is shown is a procedure to cut one of the FIG. 6b blocks 104 off the end of the billet B, as representative of various other shapes of blocks capable of production by the apparatus 200. The billet B as shown would have original (i.e., before the first block is sliced off) dimensions of about 30 cm (12 inches) wide (i.e., as shown by the plan views of FIGS. 7a–7c, between the upper and lower borders), and 2.5 m (8 feet) long (left to right in FIGS. 7a–7c), and also 20 cm (8 inches) high (which is the depth in the views and hence is not discernible).

Since the preferred billet (not shown) would be four times as large as billet B to create a domed structure with a 12 m (40 foot) base diameter (also not shown), the apparatus 200 would have to be enlarged or scaled to handle a billet nearly four times as large, or about 120 cm (48 inches) wide by 80 cm (32 inches) high, although only 5.5 m (18 feet) long (this is not shown).

The billet B shown in FIG. 7a is in a condition of having had one or more blocks 104 previously sliced off its left (i.e., left as shown in FIG. 7a) end. The billet B has been fed forwardly left in FIG. 7a (as indicated by the direction arrow 232) to prepare it for the slicing of a successive block. The hot wires 206 and 208 are aligned adjacent one lateral side of the billet B, which as shown in FIG. 7a is the lower border of the billet B. The pivot axis 225 is aligned on this same lateral side of the billet B.

FIG. 7b shows the hot wires 206 and 208 progressing through the billet B in the direction of reference arrow 234. To achieve this, the pivotal boom 210 has been pivoted clockwise (i.e., clockwise as shown in FIG. 7b) through an arc of about 14° from its start position that was shown by FIG. 7a. FIG. 7b shows the pivotal boom 210 pivoted to its extreme clockwise position, after which the pivotal boom 210 is not pivoted any further clockwise.

FIG. 7c reveals that the pivotal boom 210 comprises telescoped inner and outer slides 242 and 244. The outer slide 244 is attached pivotally about the pivot axis 225. The inner slide 242 carries the wire-terminal fixtures (not shown, but see 220 and 222 in FIG. 8) which carry the hot wires 206 and 208. The inner slide 242 can be retracted or extended in and out of the outer slide 244 as desired. FIG. 7c shows that the inner slide 242 is extended in direction 236 away from the pivot axis 225 relative to its relative state of retraction shown in FIGS. 7a and 7b, to complete formation of the block 104. Two pieces fall away from the end of the billet B, a waste piece 246 and a useful block 104.

Following FIG. 7c, the pivotal boom 210 would be pivoted back to the start position shown by FIG. 7a, the inner slide 242 would likewise be retracted back to the start position as also shown by FIG. 7a. Following all that, the billet B would be fed forwardly left again as indicated by arrow 232 in FIG. 7a to repeat again the process for slicing off another block 104.

The method shown by FIGS. 7a through 7c is presently performed manually. However, a person having ordinary skill in the art could automate much of the procedure with readily available means.

FIGS. 7a through 7c also show how the outer radius (see R' or R" in FIGS. 4, 6a and 6b) is obtained for the blocks 102–104 by adjustments available on apparatus 200. With reference back to FIGS. 3a, 4, 6a and 6b, the blocks 103 in the layer 131 shown by FIG. 6a have an outer radius R' corresponding to a little less than 1.5 m (5 feet). In contrast, the blocks 104 in the layer 132 shown by FIG. 6b have an outer radius R" of about 1.2 m (4 feet). FIGS. 7a and 7b show that, it is the leading wire 206 which delimits the outer radius for any given block. FIG. 7a has the inner and outer slides 242 and 244 adjusted such that, in the start position as shown, the leading wire 206 will cut a radius of about 1.2 m (4 feet). Accordingly, the pivotal boom 210 has been adjusted so that it will produce blocks 104 for the layer 132 represented by FIG. 6b.

The inner and outer slides 242 and 244 allow a user to adjust the span or radius from the pivot axis 225 to the leading wire 206 between an extended extreme of about 3 m (10 feet) and a retracted extreme of perhaps 1 m (3 feet) or less.

Given the foregoing, the cutting apparatus 200 allows indefinite combinations of independent adjustment among the inclination and spacing apart of the wires 206 and 208 and the radii that they define relative to the pivot axis 225 such that, the apparatus 200 in accordance with the invention can produce all the blocks shown in FIGS. 2a and 2b in order to create the domed structure 100.

Figure 9:
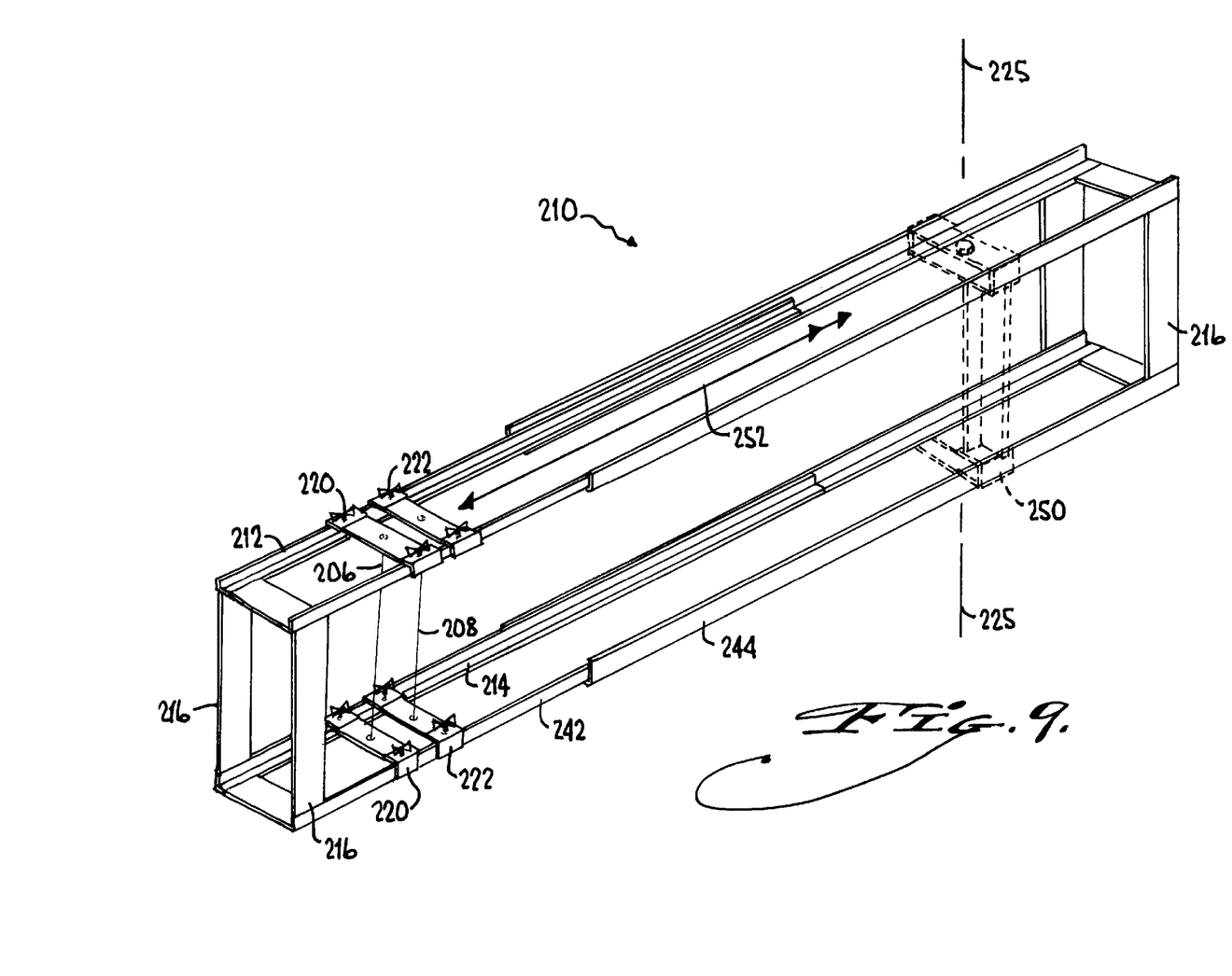
FIG. 9 is a perspective view of the pivotal boom, which was shown merely diagrammatically in FIGS. 7a through 7c, in FIG. 9 it being shown in isolation from the cutting apparatus as a whole, wherein, the pivotal boom comprises telescoped slides.
Figure 10:
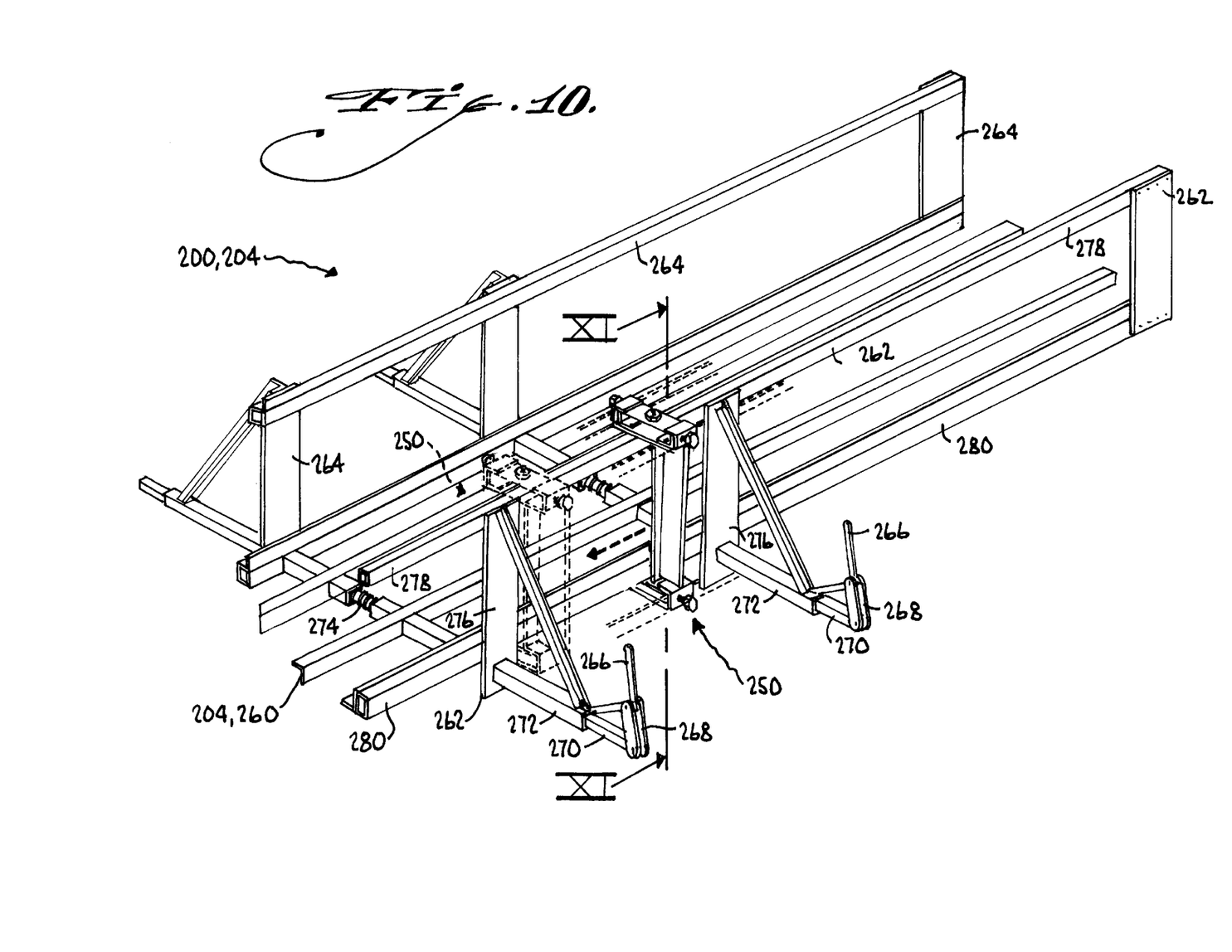
FIG. 10 is a perspective view of a bed of the cutting apparatus in accordance with the invention (not shown in the diagrammatic views of FIGS. 7a through 7c), the bed being shown in isolation from the cutting apparatus as whole; and, FIG. 11 is a partial sectional view, with portions broken away, taken along line XI—XI in FIG. 10.
Figure 11:
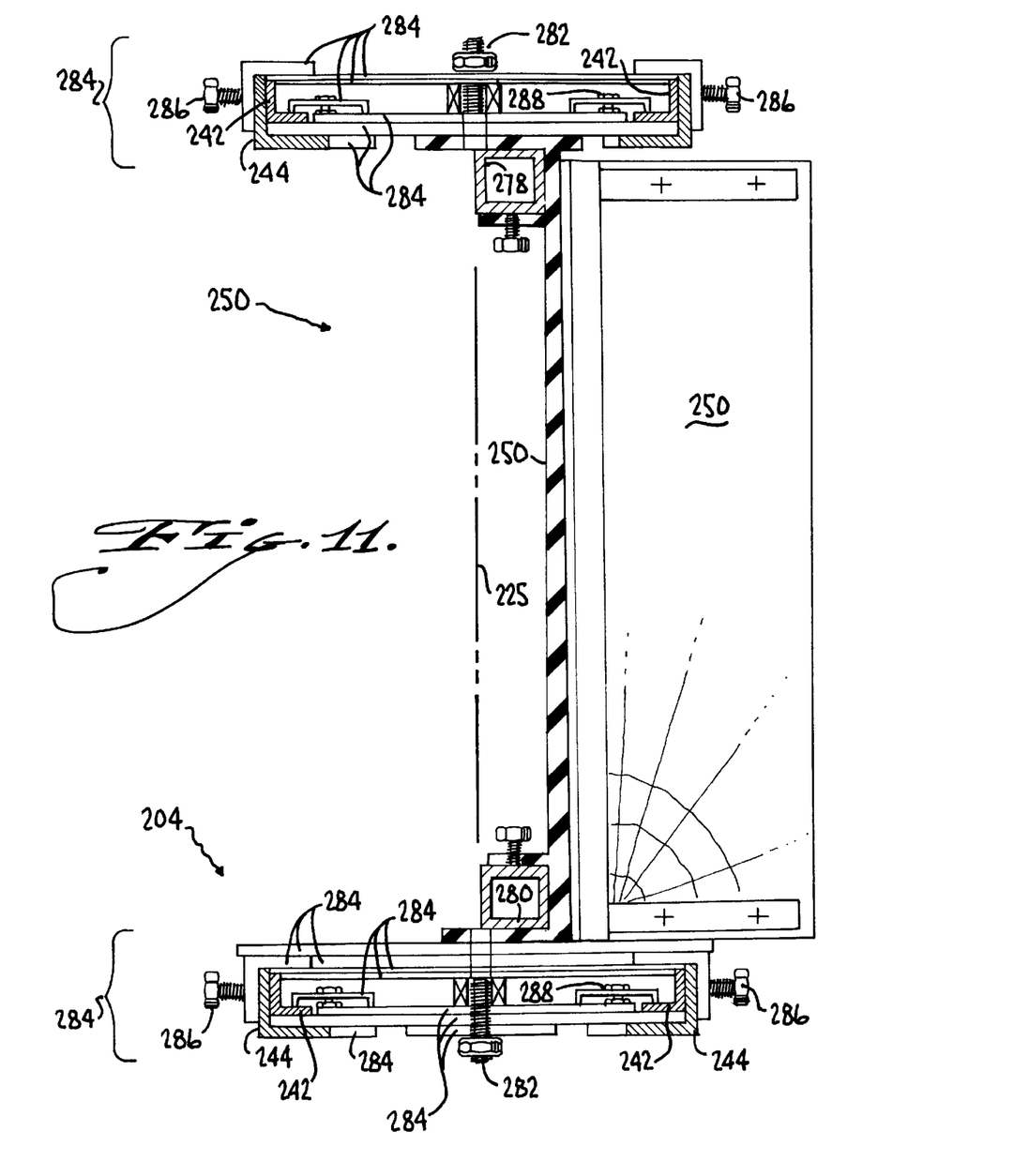

Turning now to FIGS. 9 through 11, other details of the cutting apparatus 200 will become apparent. FIG. 9 shows the pivotal boom 210 in isolation, with a saddle 250 shown in dashed lines. The saddle 250 holds the boom 210 to the bed (not shown, but see 204 in FIG. 10). The saddle 250 is shown in more particularity in FIG. 11.

FIG. 9 more particularly shows how the pivotal boom 210 is a combination of the inner and outer slides 242 and 244. The inner slide 242 extends and retracts inside the outer slide 244 along reference arrow 252, much like a trombone slide (not shown). Each slide 242 and 244 comprises upper and lower open-rectangular frames 212 and 214 (the upper and lower frames for the inner slide 242 previously were partly shown in FIG. 8). The upper and lower frames 212 and 214 are given vertical spacing and dimensional stability by box-like side boards 216 at the opposite ends of the boom 210. The inner slide 242 carries the adjustable wire-terminal fixtures 220 and 222 that carry the hot wires 206 and 208. The adjustable wire-terminal fixtures 220 and 222 are movable on the inner slide 242 to allow changes in their relative position on the inner slide 242 as well as to allow changes in the angle of inclination of the wires 206 and 208 that they carry.

FIG. 10 shows the bed 204 of the cutting apparatus 200. It comprises a planar support surface 260 on which the billet B of foam stock material (not shown) is fed in direction from right to left (see FIG. 7a). The planar support surface 260 is flanked by a fixed stop 262 and a movable stop 264 (i.e., opposed sidewalls).

The opposing stops 262 and 264 are operative to releasably compress the billet B of foam stock material (not shown) therebetween to hold the billet B securely during the cutting operation (i.e., FIGS. 7b and 7c). The fixed stop 262 remains permanently stationary. The movable stop 264 is reversibly movable in toward and/or away from the fixed stop 262 by actuation via a pair of toggles 266 on the side of the fixed stop 262. The toggles 266 actuate an over-center mechanism 268 which, when the toggles 266 are declined below horizontal (not shown), push respective push rods 270 that slide within surrounding sleeves 272 to move the movable stop 264 away from the fixed stop 262 and thereby allow a billet B of foam stock material free passage on the bed 204 (not illustrated). However, when the toggles 266 are actuated so that the toggles 266 are inclined above the horizontal (as shown), the push rods 270 are biased by coil-tension springs 274 to pull the movable stop 264 toward the fixed stop 262, and thereby compress a billet B in place for cutting (see FIGS. 7a). Other billet-clamping arrangements are possible besides the fixed and movable stop arrangement 262 and 264 shown.

The fixed stop 262 includes a pair of uprights 276 between which extends a top rail 278. The saddle 250 is shown clamped to the bed 204 via engagements with this top rail 278 and a spaced away bottom rail 280. The position of the saddle 250 between the uprights 276 is adjustable. In fact, the saddle 250 is shown in a changed position in FIG. 10 in dashed lines.

FIG. 11 is a section view showing the saddle 250, the top and bottom rails 278 and 280 of the bed 204 to which it clamps, and the inner and outer slides 242 and 244 of the pivotal boom 210 as well. The saddle 250 carries upper and lower pivot pins 282 that are inserted in upper and lower hub fixtures 284. These pivot pins 282 have a common axis extending through them, and this axis defines the pivot axis 225 for the pivotal boom 210 (see FIGS. 7a through 7c). The hub fixtures 284 are configured to allow the inner and outer slides 242 and 244 to extend therethrough. The hub fixtures 284 include one set of locking screws 286 to lock the outer slide 244 in various fixed positions in the hub fixtures 284. The hub fixtures 284 also include another set of locking screws 288 to allow the inner slide 242 (if the inner slide 242 is aligned in a given position of retraction so that it extends through the hub fixtures 288, which is not always the case as for example shown by FIGS. 7a–7c) to be locked tight if desired. As mentioned, the hub fixtures 284 are pivotal relative the bed 204 via the pivot pins 282. This arrangement allows the pivotal boom 210 to move reversibly clockwise and counterclockwise as shown in FIGS. 7a through 7c.

The cutting apparatus 200 in accordance with the invention includes multiple adjustments to form blocks (e.g., 102–104) in a great variety of conic or cylindrical configurations. A person having ordinary skill in the art, given the foregoing description, can now easily understand how to set up the apparatus 200 to get the block shapes that he or she desires to make a domed structure 100 as shown by FIGS. 2a and 2b, or make other comparable foam structures incorporating conical or cylindrical portions of foam blocks as desired. It is preferred that the apparatus 200 and method shown by FIGS. 7a through 11, would preferably be enlarged to produce a domed structure having a base diameter at least about 12 m (40 foot), but this is not shown. However, mere enlargement in scale is easily within the skills of an ordinary worker in the art, and the foregoing description and depictions of the invention amply teach how to achieve this goal.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A cutting apparatus for producing from a billet of foam stock material a building block of a type used to build blockwork dome structures, masonry style, by successive courses of such block, each completed block having spaced top and bottom sides, spaced left and right sides, and spaced inner and outer sides; the apparatus comprising:

a bed for supporting the foam stock material for a cutting operation;

a hub fixture interconnected with the bed;

a framework boom mounted to the hub fixture for pivoting relative to the bed about a given pivot axis, the framework boom comprising a relatively upper span and lower span which are held spaced apart by the hub fixture and which extend away from the hub fixture to cooperatively define for the boom a free end;

a relatively outer-upper hot-wire fixture mounted on the upper span and an outer-lower hot-wire fixture mounted on the lower span;

a relatively outer resistance-heated hot wire outstretched between the outer-upper and outer-lower hot-wire fixtures, for forming an outer side of the block with pivoting of the boom;

a relatively inner-upper hot-wire fixture mounted on the upper span and an inner-lower hot-wire fixture mounted on the lower span, wherein the upper and lower inner hot-wire fixtures are disposed between the hub fixture and correspondingly the upper and lower outer hot-wire fixtures;

an inner resistance-heated hot wire outstretched between the inner-upper and inner-lower hot-wire fixtures, for forming an inner side of the block with pivoting of the boom;

wherein at least one of the upper and lower of the outer hot-wire fixtures is adjustable on correspondingly one of the upper and lower span of the pivotal boom in order to allow changing an angle of the outer hot wire from an alignment parallel to the pivot axis—with which an outer side of a given block takes the form of a rectangular zone of a right circular cylinder—to various inclined angles, with which the outer side of the given block takes the form of a rectangular zone of a right circular cone.

2. The cutting apparatus of claim 1 further comprising sliding means for sliding one of the inner hot wire and outer hot wire through a stroke of extension and retraction, or vice versa, relative to the pivot axis, to form one of the left or right sides of the given block.

3. The cutting apparatus of claim 2 wherein:

the sliding means comprises configuring each of the upper and lower spans of the pivotal boom as a pair of telescoped slides which allow extension and foreshortening.

4. The cutting apparatus of claim 1 wherein the hub fixture comprises a boom-securing mechanism that when slackened allows sliding extension or retraction of the boom which thereby changes the boom's relative length as measured between the pivot axis and the free end, and which provides for changing in unison how far the outer and inner hot wires are located from the pivot axis.

5. The cutting apparatus of claim 1 wherein:

the bed extends between laterally spaced sides and longitudinally spaced ends; and, said cutting apparatus further comprising a saddle, mounted to one side of the bed, which supports the hub fixture and the spaced apart spans of the pivotal boom so that the upper span sweeps in a plane above the foam stock material and the lower span sweeps in a plane below the bed.

6. The cutting apparatus of claim 5 wherein the bed further comprises clamping means for clamping against opposite sides of the billet of foam stock material during a given cutting operation and thereby hold the billet of foam stock material steady.

7. The cutting apparatus of claim 6 wherein saddle supports the spaced apart spans of the pivotal boom such that pivot axis lies in a plane containing one side of the bar or billet of foam stock material.

8. The cutting apparatus of claim 5 wherein the saddle is adjustable on said one side of the bed such that a location of the saddle can be varied between opposite extremes along said one side of the bed.

9. The cutting apparatus of claim 1 wherein at least one of the upper and lower of the inner hot-wire fixtures is adjustable on correspondingly one of the upper and lower span of the pivotal boom in order to allow changing the angle of the inner hot wire from an alignment parallel to the pivot axis—with which the inner side of a given block takes the form of a rectangular zone of a right circular cylinder—to various inclined angles, with which the inner side of the given block takes the form of a rectangular zone of a right circular cone.

* * * * *